United States Patent
Huddleston

(10) Patent No.: US 7,832,012 B2
(45) Date of Patent: Nov. 9, 2010

(54) METHOD AND SYSTEM FOR ISOLATING SUSPICIOUS EMAIL

(75) Inventor: David E. Huddleston, Lakewood, OH (US)

(73) Assignee: Computer Associates Think, Inc., Islandia, NY (US)

( * ) Notice: Subject to any disclaimer, the term of this patent is extended or adjusted under 35 U.S.C. 154(b) by 1574 days.

(21) Appl. No.: 11/130,896

(22) Filed: May 17, 2005

(65) Prior Publication Data

US 2005/0273856 A1    Dec. 8, 2005

Related U.S. Application Data

(60) Provisional application No. 60/572,515, filed on May 19, 2004, provisional application No. 60/572,531, filed on May 19, 2004.

(51) Int. Cl.
*G06F 11/00* (2006.01)
*G08B 23/00* (2006.01)

(52) U.S. Cl. .............................. 726/24; 726/15; 726/23; 726/25; 726/26; 713/164; 713/165; 713/188

(58) Field of Classification Search ............ 726/2, 726/3, 4, 15, 17, 22–25, 27; 713/151, 152, 713/156, 161, 187–188, 193–194; 709/224, 709/228, 232, 206
See application file for complete search history.

(56) References Cited

U.S. PATENT DOCUMENTS

| | | | | |
|---|---|---|---|---|
| 5,842,002 | A | 11/1998 | Schnurer et al. ............. | 395/500 |
| 6,192,512 | B1 | 2/2001 | Chess ............................ | 717/5 |
| 6,282,175 | B1 * | 8/2001 | Steele et al. ................. | 370/254 |
| 6,757,830 | B1 | 6/2004 | Tarbotton et al. ........... | 713/188 |
| 6,792,556 | B1 * | 9/2004 | Dennis .......................... | 714/6 |
| 6,901,519 | B1 * | 5/2005 | Stewart et al. ................ | 726/24 |
| 2002/0056076 | A1 | 5/2002 | Made ......................... | 717/129 |
| 2002/0194490 | A1 | 12/2002 | Halperin et al. ............. | 713/200 |
| 2003/0088680 | A1 | 5/2003 | Nachenberg et al. ........ | 709/229 |
| 2003/0135791 | A1 | 7/2003 | Natvig ......................... | 714/38 |
| 2003/0149726 | A1 | 8/2003 | Spear .......................... | 709/206 |
| 2004/0111623 | A1 * | 6/2004 | Miller et al. ................. | 713/182 |
| 2004/0205419 | A1 | 10/2004 | Liang et al. .................. | 714/57 |
| 2004/0254925 | A1 * | 12/2004 | Clough ......................... | 707/4 |

FOREIGN PATENT DOCUMENTS

EP          1 136 873 A2    6/2003
WO          WO 00/34867     6/2000

(Continued)

OTHER PUBLICATIONS

Wikipedia (Oct. 23, 2008) en.wikipedia.org/wiki/Virtual_machine.*

(Continued)

*Primary Examiner*—Taghi T Arani
*Assistant Examiner*—Mohammad L Rahman
(74) *Attorney, Agent, or Firm*—Baker Botts L.L.P.

(57) ABSTRACT

A method for detecting malicious programs, the method includes determining whether an object is suspicious, opening the suspicious object in a disposable, secure, single purpose VM (virtual machine) session and detecting indications of malicious behavior when the suspicious object is opened within the VM session.

81 Claims, 4 Drawing Sheets

FOREIGN PATENT DOCUMENTS

WO     WO 03/063431 A2     7/2003

OTHER PUBLICATIONS

Notification of Transmittal of the International Search Report for application PCT/US2005/016994 (7 pages), Sep. 21, 2005.
Written Opinion of the International Searching Authority for application PCT/US2005/016994 (5 pages), Sep. 21, 2005.
XP-002241249 Norman; Norman Virus Control for Workstations; Version 5.00; Reference Guide (8 pages), Mar. 2001.
Notification of Transmittal of the International Search Report for application PCT/US2005/016996 (9 pages), Nov. 30, 2005.
Written Opinion of the International Searching Authority for application PCT/US2005/016996 (7 pages), Nov. 30, 2005.
International Searching Authority, Invitation to Pay Additional Fees for application PCT/US2005/016996 (5 pages), Oct. 6, 2005.
EPO Communication Pursuant to Article 94(3) EPC; Application No. 05 762 177.3-1245; Ref: HCD/J00049168EP.

\* cited by examiner

METHOD AND SYSTEM FOR ISOLATING SUSPICIOUS EMAIL

REFERENCE TO RELATED APPLICATION

The present disclosure is based on and claims the benefit of Provisional application Ser. No. 60/572,515 filed May 19, 2004 and Provisional application Ser. No. 60/572,531 filed May 19, 2004, the entire contents of which are herein incorporated by reference.

BACKGROUND

1. Technical Field

The present disclosure relates to email and, more specifically, to a method and system for isolating suspicious email.

2. Description of the Related Art

Today computers are used by businesses, institutions and individuals to assist in the performance of important tasks. Computers may also be used to store and organize sensitive information. For these reasons and others, users have come to rely heavily on the proper functioning of computer applications and the safe keeping of sensitive information. Even a temporary disruption of functionality or a brief exposure of sensitive information could bring costly consequences to a business, institution or user relying on computer resources.

Malicious programs represent a large and growing threat to the proper function of computer systems and their ability to keep sensitive information confidential. Malicious programs are computer programs that are specifically intended to disrupt computer systems and computer networks. The threat posed by malicious programs ranges from a simple nuisance to a severe disruption of computer and/or network function, loss or compromise of data, and/or destruction of computer hardware.

Popular forms of malicious programs may include computer viruses, worms, and Trojan horses. A computer virus is a malicious program that may propagate by infecting other computer programs by embedding a copy of itself into the other computer program. Once infected, computer viruses may be capable of delivering a malicious payload. Malicious payloads may perform a destructive act such as, for example, the deletion of files. A Trojan horse is a malicious program that is disguised as a legitimate program, that once it is run, may be able to circumvent security measures and open the door to a subsequent malicious attack. A worm is a malicious program that propagates over a computer network by sending off multiple copies of itself as it travels.

Malicious programs may use one or more of multiple channels for infecting computers and/or propagating. For example, a computer virus may be transferred from one computer to another by transferring an infected file by floppy disk, computer network and/or email. Malicious programs may be transferred by email either as a binary file Such as, for example an executable file, an email attachment and/or through the use of, for example, HTML instructions (tags) that may be embedded in the body of the email message. In addition, malicious programs can be manifested through links or attachments within Instant Messaging (IM) communications.

Many security measures have been developed to combat the threat of malicious programs. Examples of popular security measures include antivirus programs, firewalls and intrusion detection systems (IDSs). An antivirus program is a computer program that scans files and memory located on a computer for traces of viruses. Antivirus programs may scan for the presence of a virus signature. A virus signature is a pattern that can be observed in a file that has been infected with a known virus. Each known virus may have a signature to identify that particular virus. Antivirus programs that scan for virus signatures may continuously update a database of virus signatures so known viruses may be properly identified. Signature databases may then be kept up to date by adding new signatures for new viruses as they are discovered.

Antivirus programs may use heuristic scanners to detect a malicious program without relying on virus signatures. Heuristic virus scanners may be able to intelligently estimate whether computer code has been infected by a malicious program. This technique relies on programmed logic, called heuristics, to make its determinations. While a heuristic virus scan has the potential to protect against viruses that are new and unknown, the efficacy of these scanners are constantly improved by updated heuristics that should be obtained and incorporated into the heuristic virus scanners in much the same way that new virus signatures should be obtained when using the virus signature scan technique. Additionally, heuristic virus scanners may run the risk of categorizing non-malicious programs as malicious and/or categorizing malicious programs as non-malicious.

A firewall is an application or a dedicated gateway server designed to protect a secure network from an insecure network. A firewall intercepts communication traffic between the secure network and the insecure network and verifies that the traffic conforms to a predetermined security policy. Traffic that conforms to the security policy may be allowed to pass the firewall while traffic that violates the security policy may be blocked.

There are multiple types of firewalls. Some firewalls may verify that traffic conforms to the security policy by inspecting one or more portions of the header fields, such as, for example, source and destination IP addresses, ports of communication, etc. Here the security policy may contain rules pertaining to what header field characteristics are allowable and/or not allowable. These firewalls may reduce network performance by slowing down the flow of traffic as traffic is inspected. Other firewalls may allow traffic to pass without inspection where the communication has been initiated within the protected network.

An intrusion detection system (IDS) is generally implemented on a computer network to monitor the computer network and detect anomalous traffic that can be indicative of a potential problem, for example a worm infection. IDSs may be either active or passive. Active IDSs may take affirmative measures to remedy a potential infection when found while passive IDSs may be used to alert a network administrator of the potential problem. By searching for anomalous traffic, some IDSs may be able to identify previously unknown malicious programs without the help of a virus signature. Other IDSs may use signature databases to identify patterns of behavior that may be indicative of known malicious program infections.

While many of the above described systems provide some degree of protection from malicious programs, a degree of caution on the part of users can often provide a high degree of protection against malicious programs. For example, users wishing to avoid infection from malicious programs may exercise caution when executing a program that has been received as an email attachment and/or when opening an email that has embedded HTML tags. While many emails that have been automatically generated to propagate malicious programs, for example worms, may be readily identifiable as such, increasingly sophisticated worms are able to generate emails that appear to be authentic. For example, an email associated with a worm might appear to have originated from a contact known to the user and/or have a subject line that would appear familiar and/or not out of place to the user.

As malicious programs use more advanced tactics to generate more realistic emails, it may be increasingly difficult to determine whether an email is associated with a malicious program or whether the email is authentic. The user may be faced with the limited options of either opening the email and potentially exposing the user's computer system and computer network to a malicious program, or to delete the email and risk loosing an important communication.

SUMMARY

A method for detecting malicious programs, the method comprising determining whether an object is suspicious, opening the suspicious object in a disposable, secure, single purpose VM (virtual machine) session and detecting indications of malicious behavior when the suspicious object is opened within the VM session.

A system for detecting malicious programs, the system comprising a determining system for determining whether an object is suspicious, an opening system for opening the suspicious object in a disposable, secure, single purpose VM (virtual machine) session and a detecting system for detecting indications of malicious behavior when the suspicious object is opened within the VM session.

A computer recording medium including computer executable code for detecting malicious programs, comprising code for determining whether an object is suspicious, code for opening the suspicious object in a disposable, secure, single purpose VM (virtual machine) session and code for detecting indications of malicious behavior when the suspicious object is opened within the VM session.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DETAILED DESCRIPTION

Figure 1:
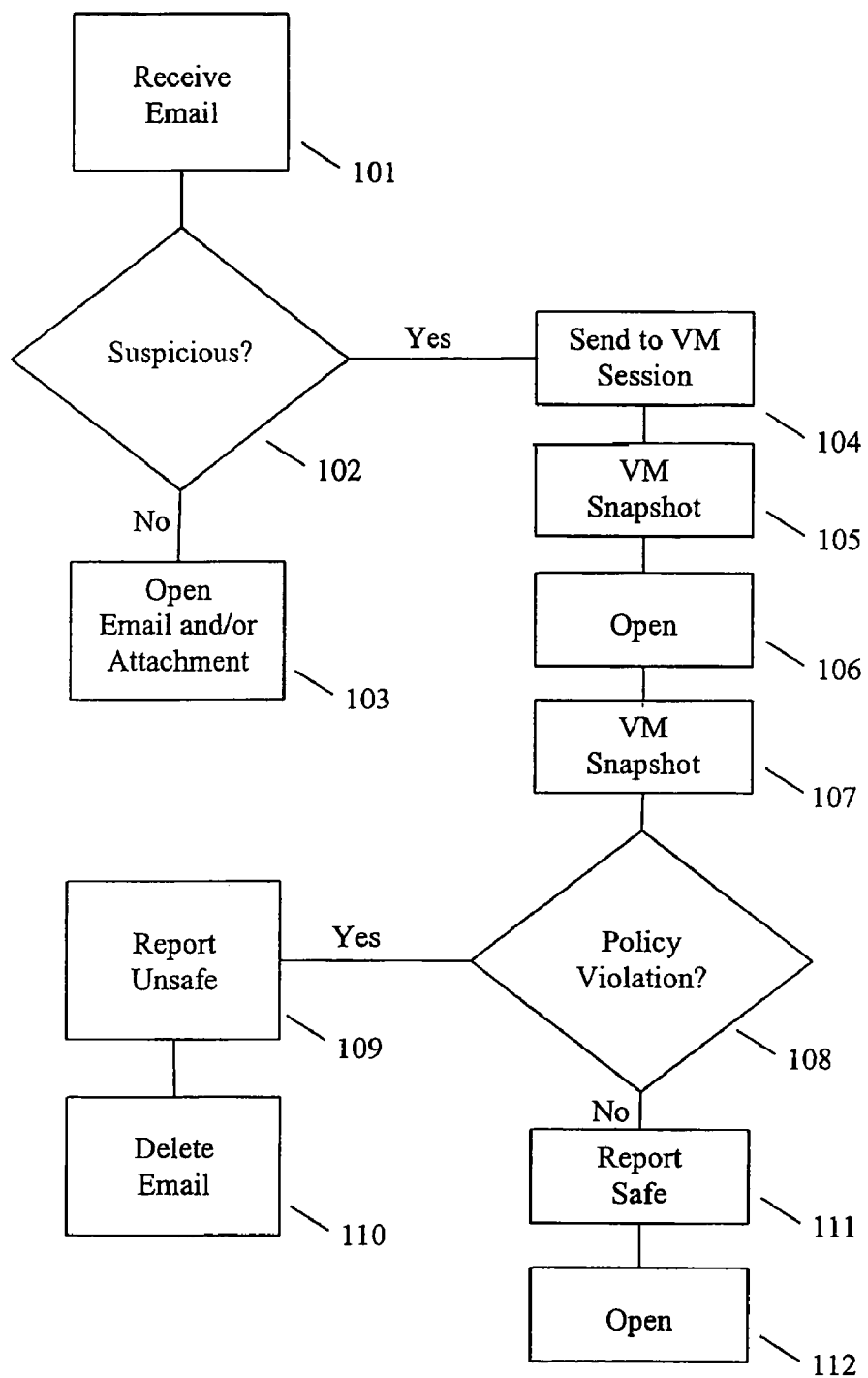
FIG. 1 shows a flowchart illustrating an embodiment of the present disclosure.

In describing the preferred embodiments of the present disclosure illustrated in the drawings, specific terminology is employed for sake of clarity. However, the present disclosure is not intended to be limited to the specific terminology so selected, and it is to be understood that each specific element includes all technical equivalents which operate in a similar manner.

An embodiment of the present disclosure provides a system and method for the testing of a suspicious email and/or email attachments prior to the opening of the email. Using this embodiment, a user will have the option to open the email directly, delete the email completely, or send the email to be tested prior to opening the email.

The testing of suspicious emails may occur on a dedicated server connected to a computer network of which a user's workstation may be a part of. The dedicated server may be optimized for executing embodiments of the present disclosure. However, the testing of emails may occur on the user's workstation or another computer, for example, a computer connected to the network.

FIG. 1 shows a flowchart illustrating an embodiment of the present disclosure. When a user receives an email (Step S101), a determination may be made as to whether the email is suspicious (Step S102). This determination may occur automatically, for example, the determination may be made by an email client used by the user to access the email. For example, the testing of emails may occur whenever an email has an attached binary file and/or an HTML tag and/or whenever certain suspicious words appear in the email's subject line. In making this determination, white lists of approved senders may be used to indicate that an email is not suspicious if it has been sent by an approved sender. Similarly, blacklists may be used to indicate that an email is suspicious if it has been sent by a sender known to send suspicious emails. According to an embodiment of the present disclosure, a sender may automatically be moved off of a white list and/or a sender may be automatically added to a blacklist if it is determined that emails originating from a sender contain malicious programs. Moreover, the email may be checked for certificates and/or digital signatures wherein emails possessing accurate certificates and/or digital signatures may be white listed and/or deemed not suspicious and/or emails possessing invalid certificates and/or digital signatures and/or lacking certificates and/or digital signatures may be blacklisted and/or deemed suspicious.

Alternatively, the determination may be made by the user who has received the email. An email may appear suspicious to the user if, for example, it has originated from an unknown sender, if the email has an unfamiliar and/or inappropriate subject line, has a binary attachment that is an executable file and/or has an unusual file name, for example, the filename has multiple extensions, and/or generally seems to be out of place.

If the email is found not to be suspicious (No Step S102) the user may open the email and/or the email attachment (Step S103). If the email is found to be suspicious (Yes Step S102) then the email may be sent to a virtual machine (VM) session within an isolation unit (Step S104) as described below.

A virtual machine is a self-contained operating environment that behaves as if it is a separate computer. A workstation or server (computer) may be able to run one or more VM sessions at the same time. Each VM session may be an emulation of a separate computer that may be used to run an operating system and one or more applications. Each VM session may be completely isolated from any other VM sessions running on the same computer. For example, each VM session may be allocated an area of the computer's random access memory (RAM) and/or hard disk storage space. A VM session may not be able to access the memory and storage allocated to another VM session. In this way, each VM session may be completely isolated from the other VM sessions running on the same computer. VM sessions according to embodiments of the present disclosure may be optimized for the discovery of behavior indicative of malicious programs and/or optimized to protect other VM sessions running on the same machine and/or to protect other systems on the same network. For example, the VM session may be optimized for the containment of malicious programs.

Figure 2:
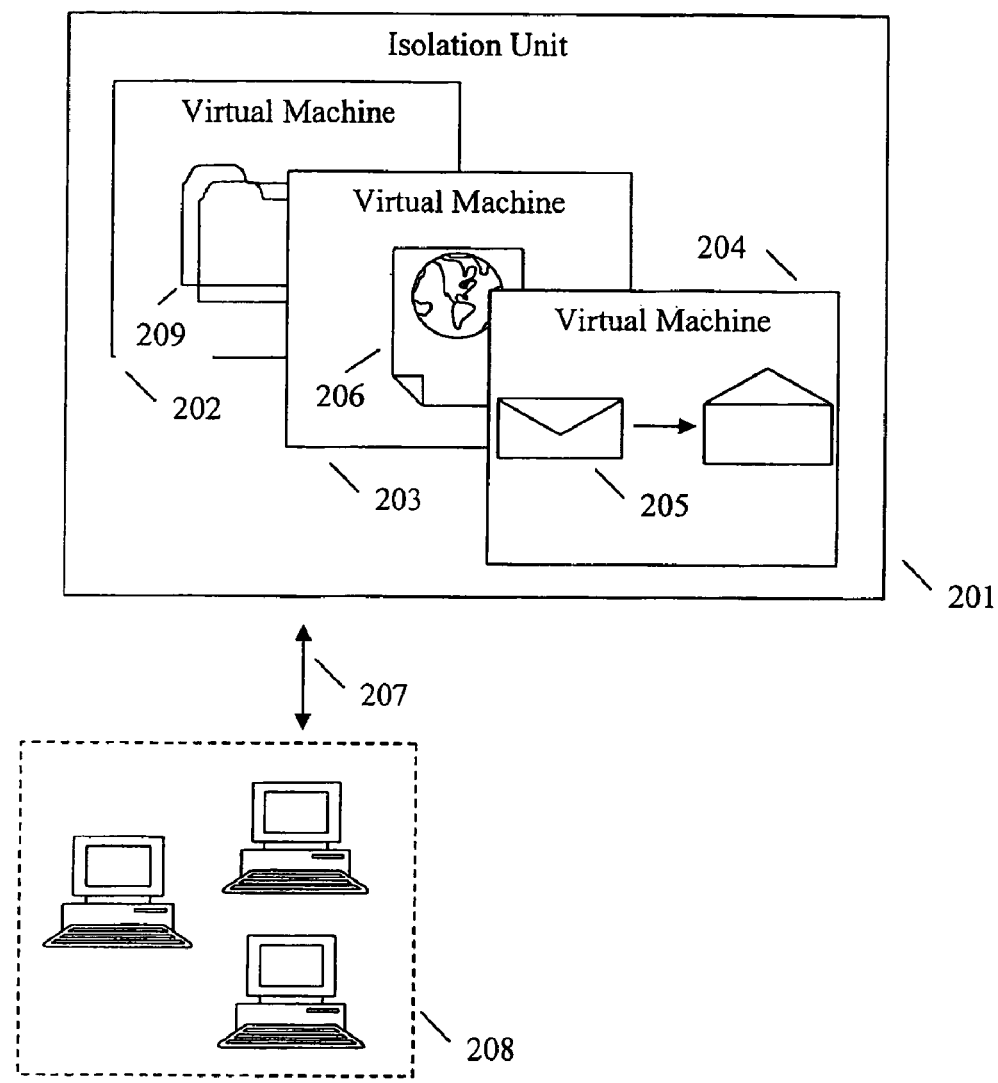
FIG. 2 shows a computer network and an isolation unit according to an embodiment of the present disclosure.

FIG. 2 shows a computer network and an isolation unit according to an embodiment of the present disclosure. The isolation unit 201, for example, may be a dedicated server. The server may run, for example, VM monitor software that can be used to partition the server's resources into one or more VM sessions 202-204. Within each VM session 202-204, an operating system may be run. Each VM session 202-204 may also run an email client application for reading emails, a web browser application for viewing websites, and any other applications that may be useful for testing emails, email attachments, websites, etc. as desired.

The isolation unit 201 may be connected to the computer network 208 through a secure 2-way firewall 207 that may be capable of preventing malicious programs within the isolation unit 201 from spreading to the computer network 208 and/or protecting the isolation unit 201 from outside attack.

Figure 3:
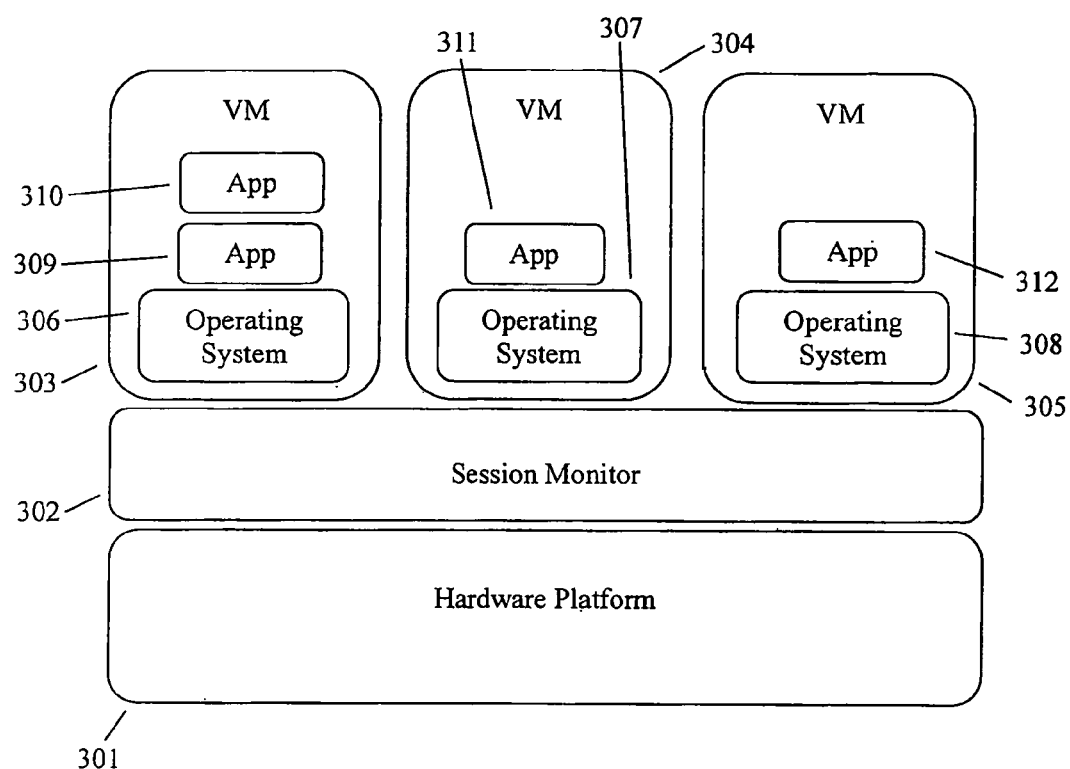
FIG. 3 shows a VM session structure according to an embodiment of the present disclosure.

FIG. 3 shows a VM session structure according to an embodiment of the present disclosure. The hardware platform 301 may be the base of the VM session structure. This hardware may be, for example, a dedicated server that may serve multiple users within the network 208. On top of the hardware platform, 301, a trusted virtual machine monitor (TVMM) 302 may be installed. This may be, for example, a high-assurance, general-purpose monitor that can partition a single tamper-resistant, general-purpose platform into multiple isolated virtual machines. For example, the TVMM 302 may be based on the architecture for trusted computing, called Terra, presented by Tal Garfinkel, Ben Pfaff, Jim Chow, Mendel Rosenblum and Dan Boneh, Computer Science Department, Stanford University. On top of the VM monitor 302, one or more VMs may be opened 303-305. Each VM 303-305 may run its own operating system 306-308. The operating systems 306-308 may be any of a number of available operating systems, for example Microsoft Windows™ XP (Windows). Multiple VMs may run different operating systems. For example, one VM may be running Windows while another VM may be running Linux. Different operating systems may be used to simulate the different platforms that the email, web page or file (object) to be opened is to be opened on. According to one embodiment of the present disclosure, the object to be opened may be opened on more than one VM running more than one operating system. According to another embodiment of the present disclosure, the object to be opened may be opened on a VM running the same operating system as the computer used by the user who has requested that the object to be opened be tested.

On top of the operating system 306-308, one or more applications may be opened 309-312. Which applications to be opened will depend on what type of object is to be tested as described below.

After an email has been sent to a VM session 202-204 (Step S104), a snapshot of the VM session 202-204 may be taken (Step S105). This snapshot may be a recording of one or more important system features of the VM session. This snapshot may also include the monitoring of important system feature and/or important system activity of the VM session for the entire time the session is used, for example, the time during and after testing.

The suspicious email 205 may then be opened within one of the VM sessions (Step S106). If the email 205 contains embedded HTML tags, the tags can be viewed using an HTML viewer, for example, a web browser. If the email 205 has a binary attachment, the attachment may be opened. In opening and/or viewing the email and/or the email attachment, an email client and/or a web browser may be run within the VM session. Additionally, if the email attachment requires an application to open, such as, for example, the attachment may be a Microsoft Word™ document, the necessary application may be run within the VM session, for example, Microsoft Word™ may be run within the VM session. In so doing, the email and/or email attachment may be fully run within the contained environment of the VM session.

After the email and/or attachment has been opened (Step S106), a second snapshot may be taken (Step S107). Sufficient time may be given between the opening of the email and/or attachment (Step S106) and the taking of the second snapshot (Step S107) to allow for any potential side effects to occur.

The two snapshots may then be compared with one another to determine what changes have been made to system features and/or what system activity has occurred. These changes may then be compared against a security policy that defines what types of changes may be acceptable and what types of changes may be indicative of a malicious program infection (Step S108). If it is determined that the security policy has not been violated (No Step S108), then a report may be sent to the user indicating that the suspicious email is likely safe to open (Step S111). The user may then open the email without fear of malicious program infection (Step S112). If it is determined that the security policy has been violated (Yes Step S108), then a report may be sent to the user indicating that the email is likely not safe to open (Step S109). At this point, the email may, for example, be automatically deleted to prevent the possibility of malicious program infection (Step S110). Alternatively, a copy of the offending malicious program may be encoded into a binary file where it could be saved without fear of further infection. This binary file may then be included as part of the report sent to the user and/or the binary file may be forwarded to an expert for further study and possibly used in defending against similar attacks in the future, for example, the file may be used to produce a virus signature file for use in antivirus programs.

The use of the above two snapshots is an example of a detection means that may be used by embodiments of the present disclosure. Other embodiments of the present disclosure may use other detection systems to determine if a malicious program infection has occurred within the VM session (Step S108). A detection system may be used to detect unacceptable, forbidden or unexpected behavior and/or side effects that may be indicative of a malicious program infection.

The report may take many forms. For example, the report may be a simple alert that a malicious program has been detected or may be a detailed presentation of all observed symptoms and effects of the detected malicious program.

After a VM session has completed testing an object, the VM session may be disposed of and a fresh VM session may be created in its place. To quickly create a new VM session, VM session images may be loaded into new VM sessions. An image may be a preset model of the data required to initiate a new VM session. For example, the VM image may contain the operating system and all of the applications, pre-installed.

According to another embodiment of the present disclosure, suspicious web pages may be tested in a similar manner. Referring to FIG. 2, a web page that is determined to be suspicious 206 may be sent to the isolation unit 201 where the web page 206 may be opened, for example, using a browser within a VM session 203. Moreover, the present disclosure may be used for the testing of suspicious files of all types 209. For example, suspicious executable files, compressed media files, for example jpeg picture files, may all be opened within a VM session 202 as described above.

According to another embodiment of the present disclosure, an isolation unit 201 need not be used. A VM session may be opened in the user's workstation for the testing of suspicious emails 205, files 209 and web pages 206.

Embodiments of the present disclosure may allow for the anonymous surfing of websites by allowing users to open a website within a VM session. Where this feature may be unwanted, embodiments of the present disclosure may allow for the prevention of anonymous web surfing. For example, the VM session may be programmed to only accept a limited number of web sites at a time, for example, web sites may be tested one at a time to impede anonymous browsing.

Figure 4:
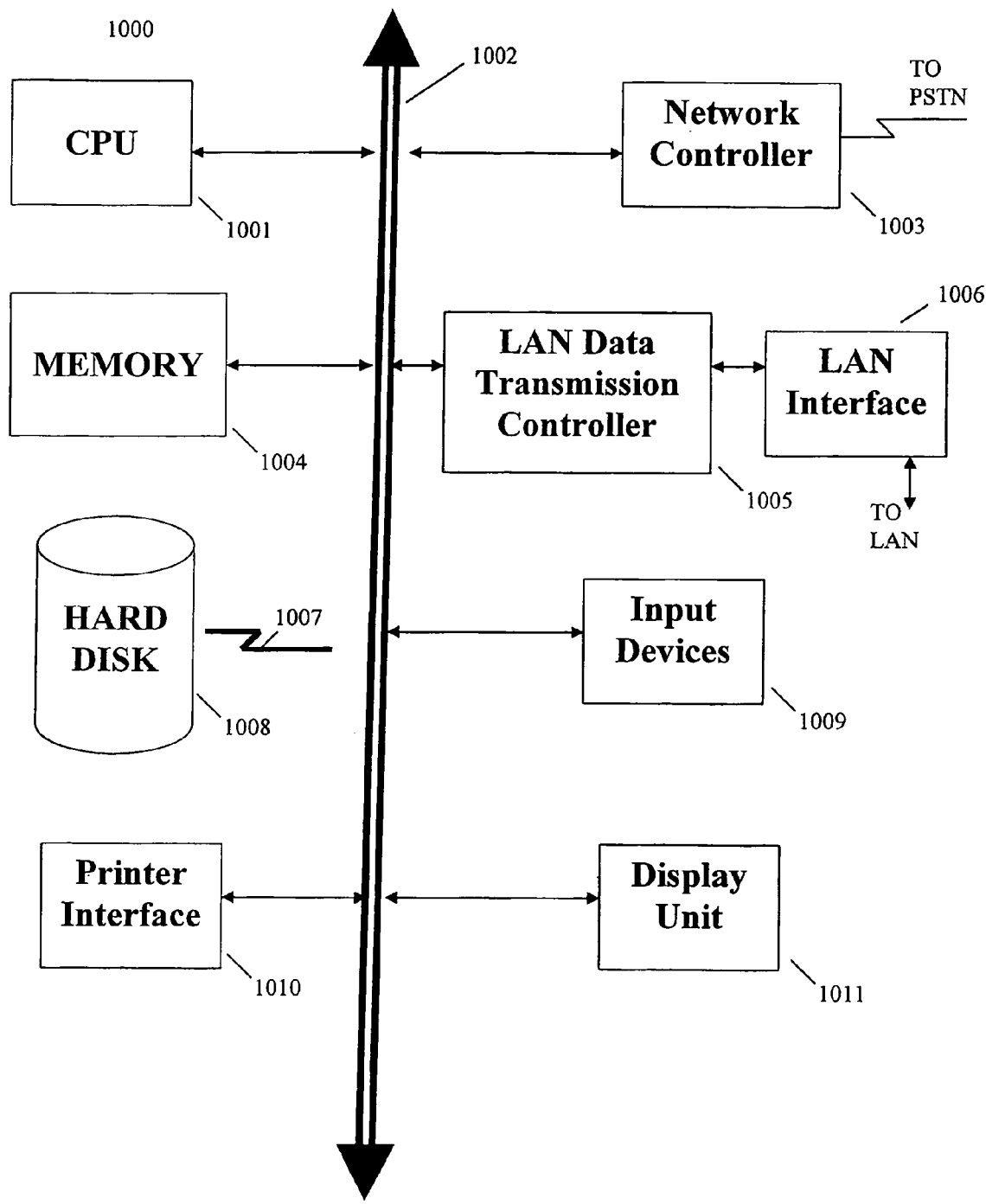
FIG. 4 shows an example of a computer system capable of implementing the method and apparatus according to embodiments of the present disclosure.

FIG. 4 shows an example of a computer system which may implement the method and system of the present disclosure. The system and method of the present disclosure may be implemented in the form of a software application running on a computer system, for example, a mainframe, personal computer (PC), handheld computer, server, etc. The software application may be stored on a recording media locally accessible by the computer system and accessible via a hard wired or wireless connection to a network, for example, a local area network, or the Internet.

The computer system referred to generally as system 1000 may include, for example, a central processing unit (CPU) 1001, random access memory (RAM) 1004, a printer interface 1010, a display unit 1011, a local area network (LAN) data transmission controller 1005, a LAN interface 1006, a network controller 1003, an internal buss 1002, and one or more input devices 1009, for example, a keyboard, mouse etc. As shown, the system 1000 may be connected to a data storage device, for example, a hard disk, 1008 via a link 1007.

The above specific embodiments are illustrative, and many variations can be introduced on these embodiments without departing from the spirit of the disclosure or from the scope of the appended claims. For example, elements and/or features of different illustrative embodiments may be combined with each other and/or substituted for each other within the scope of this disclosure and appended claims.

What is claimed is:

1. A method for detecting malicious programs, the method comprising:
    determining whether an object is suspicious;
    opening, in response to determining that the object is suspicious, the suspicious object in a disposable, secure, single purpose virtual machine (VM) session running on a computer system; and
    detecting indications of malicious behavior when the suspicious object is opened within the VM session, the detecting of the indications of the malicious behavior comprising:
        taking a first snapshot of one or more system features of the VM session prior to opening the object in the VM session;
        taking a second snapshot of the one or more system features of the VM session after the opening of the object in the VM session; and
        comparing the first snapshot with the second snapshot to detect indications of the malicious programs within the VM session.

2. The method of claim 1, wherein said object comprises an email.

3. The method of claim 1, wherein said object comprises a web page.

4. The method of claim 2, wherein said email comprises an HTML tag within the email.

5. The method of claim 1, wherein said object comprises a file.

6. The method of claim 5, wherein said file comprises an email attachment.

7. The method of claim 1, wherein the object comprises an Instant Messaging communication.

8. The method of claim 2, wherein determining whether the object is suspicious is based on a subject line of the email.

9. The method of claim 1, wherein determining whether the object is suspicious is based on an originator of the object.

10. The method of claim 1, wherein determining whether the object is suspicious comprises making an automatic determination.

11. The method of claim 1, wherein determining whether the object is suspicious comprises having a user who has received the object make the determination.

12. The method of claim 1, wherein the computer system on which the VM session is running is running a virtual machine monitor.

13. The method of claim 1, wherein the opening the object in the VM session comprises:
    opening a VM session;
    running an operating system within the VM session;
    running one or more applications useful for opening the object; and
    opening the object using the operating system and the one or more applications useful for opening the object.

14. The method of claim 1, wherein the computer system on which the VM session is running comprises a dedicated server.

15. The method of claim 14, wherein the dedicated server comprises an isolation unit.

16. The method of claim 14, wherein the dedicated server is connected to a computer network.

17. The method of claim 16, wherein one or more objects are sent to the dedicated server from one or more workstations connected to the computer network.

18. The method of claim 16, wherein the dedicated server is connected to the computer network via a 2-way firewall.

19. The method of claim 14, wherein the dedicated server is optimized for detecting indications of malicious programs.

20. The method of claim 14, wherein the dedicated server is optimized for containment of malicious programs.

21. The method of claim 1, wherein the computer system on which the VM session is running comprises a workstation of a user who has received the object.

22. The method of claim 1, wherein the detecting of indications of the malicious behavior comprises monitoring system activity of the VM session after opening the object.

23. The method of claim 1, wherein the detecting of indications of the malicious behavior comprises:
    observing at least one effect of opening the object;
    comparing the at least one observed effect against a security policy; and
    detecting that malicious behavior is present when at least one of the effects of opening the object violates the security policy.

24. The method of claim 1, further comprising sending a report to a user when indications of the malicious behavior have been detected.

25. The method of claim 1, wherein at least a portion of the suspicious object is encoded into a format that can be saved without fear of further infection.

26. The method of claim 25, wherein the format comprises a binary file format.

27. The method of claim 26, further comprising sending a report to a user including the binary file.

28. A system for detecting malicious programs comprising:
    one or more memory units; and
    one or more processing units operable to perform operations comprising:
        determining whether an object is suspicious;

opening, in response to determining that the object is suspicious, the suspicious object in a disposable, secure, single purpose virtual machine (VM) session; and detecting indications of malicious behavior when the suspicious object is opened within the VM session, the detecting comprising:

taking a first snapshot of one or more system features of the VM session prior to opening the object in the VM session;

taking a second snapshot of the one or more system features of the VM session after the opening of the object in the VM session; and comparing the first snapshot with the second snapshot to detect indications of the malicious programs within the VM session.

29. The system of claim 28, wherein said object comprises an email.

30. The system of claim 28, wherein said object comprises a web page.

31. The system of claim 29, wherein said email comprises an HTML tag within an email.

32. The system of claim 28, wherein said object comprises a file.

33. The system of claim 32, wherein said file comprises an email attachment.

34. The system of claim 28, wherein said object comprises an Instant Messaging communication.

35. The system of claim 29, wherein the determination that the object is suspicious is based on a subject line of the email.

36. The system of claim 28, wherein the determination that the object is suspicious is based on an originator of the object.

37. The system of claim 28; wherein determining whether the object is suspicious comprises making an automatic determination.

38. The system of claim 28, wherein determining whether the object is suspicious comprises having a user who has received the object make the determination.

39. The system of claim 28, wherein the VM session is opened on a computer running a virtual machine monitor.

40. The system of claim 28, wherein the one or more processing units are operable to open, in response to determining that the object is suspicious, the suspicious object by performing operations comprising:

opening a VM session;
running an operating system within the VM session;
running one or more applications useful for opening the object; and
opening the object using the operating system and the one or more applications useful for opening the object.

41. The system of claim 28, wherein the VM session is opened on a dedicated server.

42. The system of claim 41, wherein the dedicated server comprises an isolation unit.

43. The system of claim 41, wherein the dedicated server is connected to a computer network.

44. The system of claim 43, wherein one or more objects are sent to the dedicated server from one or more workstations connected to the computer network.

45. The system of claim 43, wherein the dedicated server is connected to the computer network via a 2-way firewall.

46. The system of claim 41, wherein the dedicated server is optimized for detecting indications of malicious programs.

47. The system of claim 41, wherein the dedicated server is optimized for containment of malicious programs.

48. The system of claim 28, wherein the VM session is opened on a workstation of a user who has received the object.

49. The system of claim 28, wherein the one or more processing units are operable to monitor system activity of the VM session after opening the object.

50. The system of claim 28, wherein the detecting comprises:

observing one or more effects of opening the object;
comparing the observed effects against a security policy; and
detecting that the malicious program is present when one or more of the one or more effects of opening the object violates the security policy.

51. The system of claim 28, wherein the one or more processing units are operable to send a report to a user when indications of the malicious program have been detected.

52. The system of claim 28, wherein at least a portion of the suspicious object is encoded into a format that can be saved without fear of further infection.

53. The system of claim 52, wherein the format comprises a binary file format.

54. The system of claim 53, wherein the one or more processing units are operable to send a report to a user including the binary file.

55. A non-transitory, tangible computer-readable storage medium including computer executable code for detecting malicious programs, comprising:

code for determining whether an object is suspicious;
code for opening, in response to determining that the object is suspicious, the suspicious object in a disposable, secure, single purpose virtual machine (VM) session; and
code for detecting indications of malicious behavior when the suspicious object is opened within the VM session, the code for detecting for the malicious behavior within the VM session comprising:

code for taking a first snapshot of one or more system features of the VM session prior to opening the object in the VM session;
code for taking a second snapshot of the one or more system features of the VM session after the opening of the object in the VM session; and
code for comparing the first snapshot with the second snapshot to detect indications of the malicious programs within the VM session.

56. The non-transitory, tangible computer-readable storage medium of claim 55, wherein said object comprises an email.

57. The non-transitory, tangible computer-readable storage medium of claim 55, wherein said object comprises a web page.

58. The non-transitory, tangible computer-readable storage medium of claim 56, wherein email comprises an HTML tag within an email.

59. The non-transitory, tangible computer-readable storage medium of claim 55, wherein said object comprises a file.

60. The non-transitory, tangible computer-readable storage medium of claim 59, wherein said file comprises an email attachment.

61. The non-transitory, tangible computer-readable storage medium of claim 55, wherein said object comprises an Instant Messaging communication.

62. The non-transitory, tangible computer-readable storage medium of claim 55, wherein the determination whether the object is suspicious is based on a subject line of the email.

63. The non-transitory, tangible computer-readable storage medium of claim 55, wherein the determination whether the object is suspicious is based on an originator of the object.

64. The non-transitory, tangible computer-readable storage medium of claim 55, wherein determining whether the object is suspicious comprises making an automatic determination.

65. The non-transitory, tangible computer-readable storage medium of claim 55, wherein determining that the object is suspicious comprises having a user who has received the object make the determination.

66. The non-transitory, tangible computer-readable storage medium of claim 55, wherein the VM session is opened on a computer running a virtual machine monitor.

67. The non-transitory, tangible computer-readable storage medium of claim 55, wherein the code for opening the suspicious object in the VM session comprises:
- code for opening a VM session;
- code for running an operating system within the VM session;
- code for running one or more applications useful for opening the object; and
- code for opening the object using the operating system and the one or more applications useful for opening the object.

68. The non-transitory, tangible computer-readable storage medium of claim 55, wherein the VM session is opened on a dedicated server.

69. The non-transitory, tangible computer-readable storage medium of claim 68, wherein the dedicated server comprises an isolation unit.

70. The non-transitory, tangible computer-readable storage medium of claim 68, wherein the dedicated server is connected to a computer network.

71. The non-transitory, tangible computer-readable storage medium of claim 68, wherein one or more objects are sent to the dedicated server from one or more workstations connected to the computer network.

72. The non-transitory, tangible computer-readable storage medium of claim 68, wherein the dedicated server is connected to the computer network via a 2-way firewall.

73. The non-transitory, tangible computer-readable storage medium of claim 68, wherein the dedicated server is optimized for detecting indications of malicious programs.

74. The non-transitory, tangible computer-readable storage medium of claim 68, wherein the dedicated server is optimized for containment of malicious programs.

75. The non-transitory, tangible computer-readable storage medium of claim 55, wherein the VM session is opened on a workstation of a user who has received the object.

76. The non-transitory, tangible computer-readable storage medium of claim 55, wherein the detecting of indications of the malicious program within the VM session comprises monitoring system activity of the VM session after opening the object.

77. The non-transitory, tangible computer-readable storage medium of claim 55, wherein the code for detecting indications of the malicious behavior within the VM session comprises:
- code for observing one or more effects of opening the object;
- code for comparing the observed effects against a security policy; and
- code for detecting that the malicious program is present when one or more of the one or more effects of opening the object violates the security policy.

78. The non-transitory, tangible computer-readable storage medium of claim 55, further comprising code for sending a report to a user when indications of the malicious program have been detected.

79. The non-transitory, tangible computer-readable storage medium of claim 55, wherein at least a portion of the suspicious object is encoded into a format that can be saved without fear of further infection.

80. The non-transitory, tangible computer-readable storage medium of claim 79, wherein the format comprises a binary file format.

81. The non-transitory, tangible computer-readable storage medium of claim 80, further comprising code for sending a report to a user including the binary file.

* * * * *